US011691529B2

(12) United States Patent
Fuhlbrigge et al.

(10) Patent No.: US 11,691,529 B2
(45) Date of Patent: Jul. 4, 2023

(54) SYSTEMS AND METHODS FOR AUTOMATED ELECTRICAL CONNECTOR POSITIONING FOR ELECTRIC VEHICLE CHARGING

(71) Applicant: ABB Schweiz AG, Baden (CH)

(72) Inventors: Thomas A. Fuhlbrigge, Ellington, CT (US); Gregory A. Cole, West Hartford, CT (US); William J. Eakins, Coventry, CT (US); Stefan Rakuff, Windsor, CT (US); Harshang Shah, Bloomfield, CT (US); Sangeun Choi, Simbury, CT (US); Martin Krucinski, Glastonbury, CT (US)

(73) Assignee: ABB Schweiz AG, Baden (CH)

( * ) Notice: Subject to any disclaimer, the term of this patent is extended or adjusted under 35 U.S.C. 154(b) by 812 days.

(21) Appl. No.: 16/579,342

(22) Filed: Sep. 23, 2019

(65) Prior Publication Data

US 2021/0086641 A1    Mar. 25, 2021

(51) Int. Cl.
*B60L 53/35*    (2019.01)
*B60L 53/36*    (2019.01)
(Continued)

(52) U.S. Cl.
CPC .............. *B60L 53/35* (2019.02); *B60L 53/16* (2019.02); *B60L 53/36* (2019.02); *B60L 53/66* (2019.02); *H02J 7/0045* (2013.01); *G05B 15/02* (2013.01)

(58) Field of Classification Search
CPC .......... B60L 53/36; B60L 53/16; B60L 53/35; B60L 53/66; G05B 15/02; H02J 7/0045
(Continued)

(56) References Cited

U.S. PATENT DOCUMENTS

| 5,821,731 A | * | 10/1998 | Kuki ....................... B60L 50/52 |
| | | | 320/108 |
| 7,999,506 B1 | * | 8/2011 | Hollar ..................... B60L 53/34 |
| | | | 320/109 |

(Continued)

FOREIGN PATENT DOCUMENTS

| EP | 3552866 A1 | * | 10/2019 | ............. B60L 53/16 |
| GB | 2593850 A | * | 10/2021 | ............. B60L 53/14 |
| GB | 2602765 A | * | 7/2022 | ............. B60L 53/14 |

OTHER PUBLICATIONS

European Patent Office, International Search Report in International Patent Application No. PCT/IB2020/058392, 5 pp. (dated Dec. 14, 2020).

(Continued)

*Primary Examiner* — Richard Isla
*Assistant Examiner* — Manuel Hernandez
(74) *Attorney, Agent, or Firm* — Leydig, Voit & Mayer, Ltd.

(57) ABSTRACT

Devices, methods and software for automated electrical connector positioning for electric vehicle (EV) charging are provided. Using, for example, the disclosed automatic charging device, a method for charging an EV includes determining receipt of an EV-side electrical connector to a charging zone of an EV charging environment. The method includes actuating a charger-side electrical connector from an initial position outside of the charging zone to a final position inside of the charging zone. The final position corresponds to the charger-side electrical connector matingly engaged with the EV-side electrical connector.

23 Claims, 8 Drawing Sheets

(51) Int. Cl.
*B60L 53/66* (2019.01)
*B60L 53/16* (2019.01)
*H02J 7/00* (2006.01)
*G05B 15/02* (2006.01)

(58) Field of Classification Search
USPC .......................................................... 320/109
See application file for complete search history.

(56) References Cited

U.S. PATENT DOCUMENTS

| | | | | |
|---|---|---|---|---|
| 8,305,036 | B2* | 11/2012 | Toya | H02J 7/0042 |
| | | | | 320/108 |
| 8,362,744 | B2* | 1/2013 | Terao | H01F 38/14 |
| | | | | 320/108 |
| 9,660,487 | B1* | 5/2017 | Mu | H02J 50/10 |
| 10,317,853 | B2* | 6/2019 | Inagaki | G06N 3/08 |
| 11,479,136 | B2* | 10/2022 | Yang | B60L 53/35 |
| 2009/0079388 | A1 | 3/2009 | Reddy | |
| 2015/0042278 | A1 | 2/2015 | Leary | |
| 2015/0246620 | A1* | 9/2015 | Fukushima | B60L 53/38 |
| | | | | 307/10.1 |
| 2017/0136902 | A1* | 5/2017 | Ricci | B60L 53/36 |
| 2017/0225583 | A1 | 8/2017 | Chai et al. | |
| 2018/0056800 | A1* | 3/2018 | Meichle | H04B 5/0037 |
| 2018/0154785 | A1* | 6/2018 | Wetzel | B60L 53/22 |
| 2018/0170200 | A1* | 6/2018 | Brown | B60L 53/124 |
| 2019/0275907 | A1* | 9/2019 | Lee | G05D 1/0212 |
| 2020/0353833 | A1* | 11/2020 | Kim | H02J 7/0045 |

OTHER PUBLICATIONS

European Patent Office, Written Opinion in International Patent Application No. PCT/IB2020/058392, 6 pp. (dated Dec. 14, 2020).
Korosec, "An Autonomous Robot EV Charger is Coming to San Francisco," Webpage downloaded from the Internet at https://techcrunch.com/2019/08/01/an-autonomous-robot-ev-charger-is-coming-to-san-francisco/on Jan. 6, 2021, 4 pp. (Aug. 1, 2019).

* cited by examiner

SYSTEMS AND METHODS FOR AUTOMATED ELECTRICAL CONNECTOR POSITIONING FOR ELECTRIC VEHICLE CHARGING

TECHNICAL FIELD

The present disclosure relates to charging systems and methods for electric vehicles and, more particularly, to systems and methods for automated positioning of electrical connectors between a vehicle charger and the vehicle.

BACKGROUND

Use of electrical vehicles is becoming increasingly popular due to the environmental benefits of lessening pollution caused by fossil fuel burning vehicle engines from the environment, especially in densely populated urban environments. As with most mobile electrical devices, electrical vehicles carry electrical power storage devices or batteries, which provide power to the vehicle propulsion and other systems. As can be appreciated, the vehicle batteries require periodic recharging to provide consistent vehicle operation.

At present, electric vehicle recharging is a time consuming process that is typically carried out over long periods, for example, overnight or during prolonged periods when the electric vehicle is parked. Power dispensers include flexible conduits or wire bundles that include a connector at their end, which plugs into a vehicle receptacle and then begins the transfer of power from the dispenser the vehicle's battery.

Traditional vehicle power dispensers operate at around 200-240 Volts AC, and transfer about 30 Amp of electrical power into a vehicle. As a consequence, providing a full charge to a vehicle can take up to 10 hours or more. With the increase in popularity of electric vehicles, convenient, user-friendly, automated and "hands-free" charging solutions requiring little to no training or intervention on the part of users, and that are easy to install and maintain with minimal modification of existing facilities, are desirable.

SUMMARY OF THE DISCLOSURE

In one aspect, the disclosure describes an automatic charging device (ACD) for an electric vehicle (EV). The ACD includes a charger link having distal and proximal ends. The ACD includes a charger-side electrical connector operably coupled to the charger link proximal the distal end thereof. The ACD includes an actuator operably coupled to the charger link proximal the proximal end thereof for moving the charger link distal end toward an EV-side electrical connector. The ACD includes at least one sensor for providing at least one signal representative of a position of the EV and/or the EV-side electrical connector in a charging environment. The ACD includes a controller in communication with the actuator and the interface. The controller is configured to: determine, based on the at least one signal, receipt of the EV-side electrical connector to a charging zone of the EV charging environment; and actuate, using the actuator, the charger-side electrical connector from an initial position outside of the charging zone to a final position inside of the charging zone, the final position corresponding to the charger-side electrical connector matingly engaged with the EV-side electric al connector.

In another aspect, the disclosure describes a method for charging an EV with an ACD. The method includes determining, by a controller of the ACD, receipt of an EV-side electrical connector to a charging zone of an EV charging environment; and actuating, by the controller using an actuator of the ACD, a charger-side electrical connector from an initial position outside of the charging zone to a final position inside of the charging zone, the final position corresponding to the charger-side electrical connector matingly engaged with the EV-side electrical connector.

In yet another aspect, the disclosure describes a non-transitory computer-readable storage medium. Stored on the non-transitory computer-readable storage medium are program instructions which, when executed by one or more processors of an ACD for an EV, cause the processor(s) and/or the ACD to: determine receipt of an EV-side electrical connector to a charging zone of an EV charging environment; and actuate a charger-side electrical connector of the ACD from an initial position outside of the charging zone to a final position inside of the charging zone, the final position corresponding to the charger-side electrical connector matingly engaged with the EV-side electrical connector, where the charger-side electrical connector is electrically coupled to a power source positioned outside of the EV.

Further and alternative aspects and features of the disclosed principles will be appreciated from the following detailed description and the accompanying drawings. As will be appreciated, the principles related to devices, systems, and methods for automated electrical connector positioning for EV charging disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
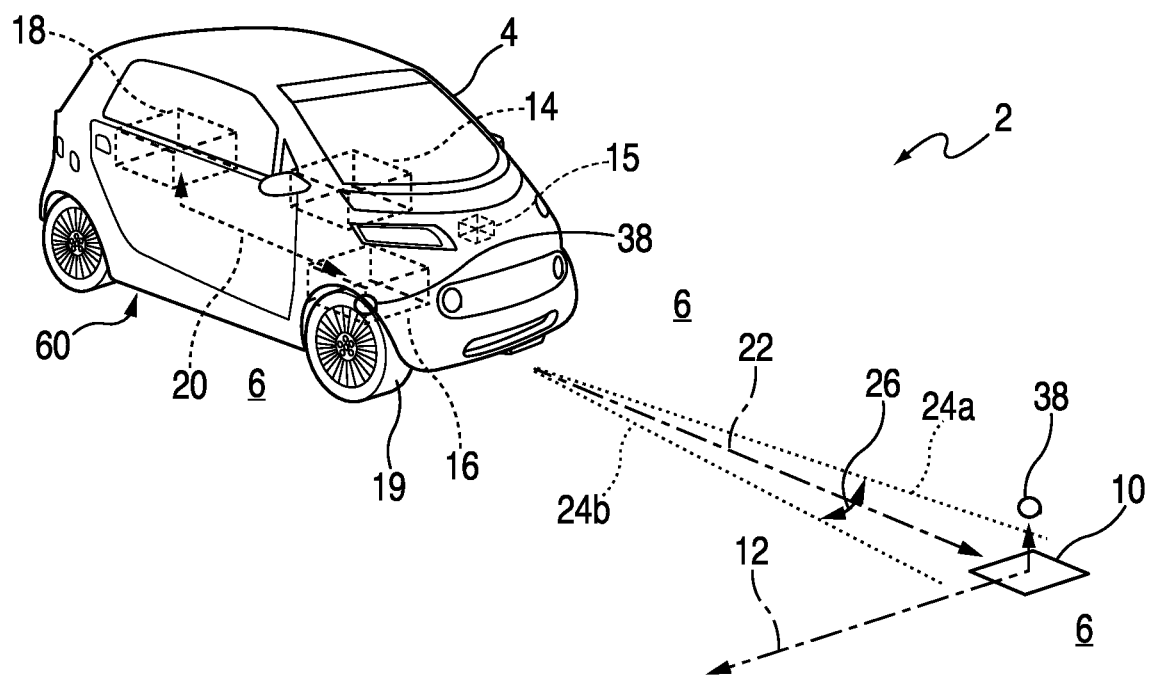
FIG. 1 is a perspective and schematic view of an electric vehicle (EV) charging environment including a charging zone according to an embodiment of the disclosure.

FIG. 1 is a perspective view of an electric vehicle (EV) charging environment 2 according to an embodiment of the disclosure. In the example shown in FIG. 1, an EV 4 is positioned on a ground surface 6. EV 4 is a car, as shown in FIG. 1. Alternatively, EV 4 may be a truck, a motorcycle, a moped, a bus, a scooter, a farm implement or any other on- or off-highway vehicle. In the example shown, ground surface 6 is a floor of a garage or other vehicle storage facility of a home or business. Alternatively, ground surface 6 may be a surface of a parking lot. Environment 2 includes a charging zone 10 defining a point, region, volume, and/or area for which at least a portion is coplanar with the ground surface 6. Charging equipment (not shown in FIG. 1) for charging the EV 4 is positioned in environment 2 at, or proximal to, the charging zone 10. In some embodiments, such charging equipment is or includes the devices and systems for automated positioning of electrical connectors between the charging equipment and the EV 4, as described herein. In some embodiments, at least a part of the charging equipment is positioned in, on or, at least in part, beneath ground surface 6. In other embodiments, at least a part of the charging equipment is positioned in or on supporting structures of the vehicle storage facility (e.g., a wall and/or ceiling of a garage of a home). In any event, at least portion of the EV 4 charging equipment is used to facilitate a connection between an EV-side electrical connector 38 (e.g., in a vehicle unit 16 positioned on or in an underside 60 of the EV 4, and that faces and is at least partially exposed to the ground surface 6) and a charger-side electrical connector 34. For this purpose, at least a part of the charging equipment (e.g., charger-side electrical connector 34) is operatively coupled to or associated with an electric power source (e.g., a utility grid, not shown in FIG. 1), either directly or through a transforming, conditioning, and/or conversion device such as a transformer or converter. First 12 and second 20 power flows can thus be selectively enabled between the power source and the charger-side electrical connector 34, and on to an EV 4 power storage device 18 via the EV-side electrical connector 38.

EV 4 includes a drivetrain 14 providing motive power to the EV 4 for driving. EV 4 includes the vehicle unit 16 and the power storage device 18 (e.g., one or more batteries). Power storage device 18 is operatively coupled to drivetrain 14 for providing electric power thereto to enable providing motive power for EV 4 (e.g., to turn its wheels 19) selectively during operation. Structures and systems of the EV 4 that accomplish the provision of power to the drivetrain 14 selectively by an operator (not shown) of the EV 4 are omitted for simplicity. At least a portion of vehicle unit 16 faces and is exposed or exposable to ground surface 6. It is noted that, while the EV 4 is shown in one orientation as it approaches the charging zone 10, any orientation of approach is also contemplated. Vehicle unit 16 is operatively coupled to battery 18 to provide an interface for providing electrical power to charge the battery 18. Upon the charger-side electrical connector (not shown in FIG. 1) being electrically coupled with an EV-side electrical connector 38, a second electric power flow 20 can thus be selectively enabled between the battery 18 and the grid power source, for instance.

In the EV charging environment 2 shown in FIG. 1, EV 4 is being driven and approaches the charging zone 10. A driver of EV 4 (e.g., a human driver (not shown) and/or an autonomous vehicle driving control system 15) steers or otherwise controls the EV 4 to approach charging zone 10 along a centerline path 22. As shown in FIG. 1, centerline path 22 extends from EV 4 to at least approximately a center point of charging zone 10 proximal ground surface 6. Based on the particular dimensions and other specifications of EV 4, charging equipment (not shown in FIG. 1) positioned at, or proximal to, charging zone 10, and/or vehicle unit 16, an approach path of EV 4 to charging zone 10 may deviate from the target centerline path 22 by an allowable deviation 24. The allowable deviation may be in any direction, including but not limited to a horizontal or vertical direction. Allowable deviation 24 includes a driver side deviation 24a and a passenger side deviation 24b, for example. An allowable deviation angle 26 is defined between lines defining driver side deviation 24a and passenger side deviation 24b. In three dimensions, the deviation angle 26 may form a conical volume that accounts for height of ground clearance of the EV 4, as well pitch, yaw and roll of the EV 4's trajectory during the approach to the charging zone 10, and also during the connection and charging operations.

Figure 2A:
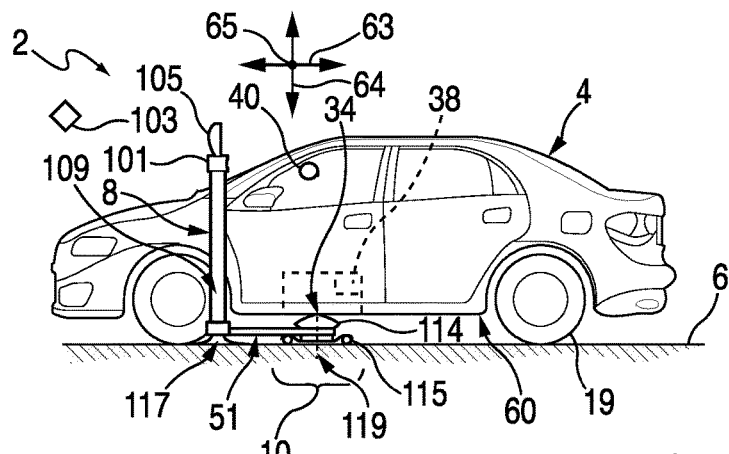
FIGS. 2A, 2B and 2C are respectively side, front and underside plan view schematic diagrams of the charging environment shown in FIG. 1 with the EV positioned over the charging zone, according to an embodiment of the disclosure.
Figure 2B:
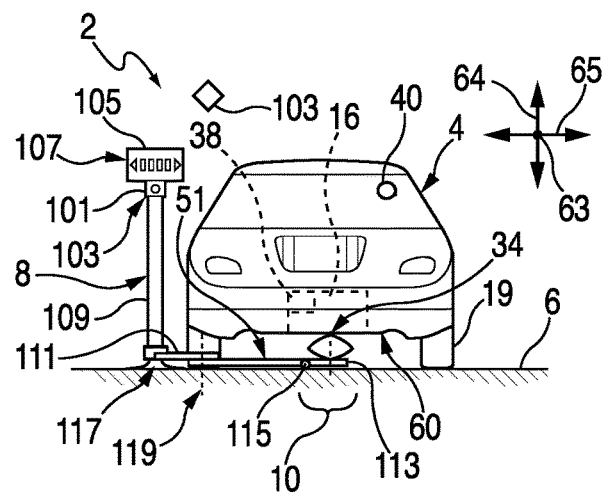
Figure 2C:
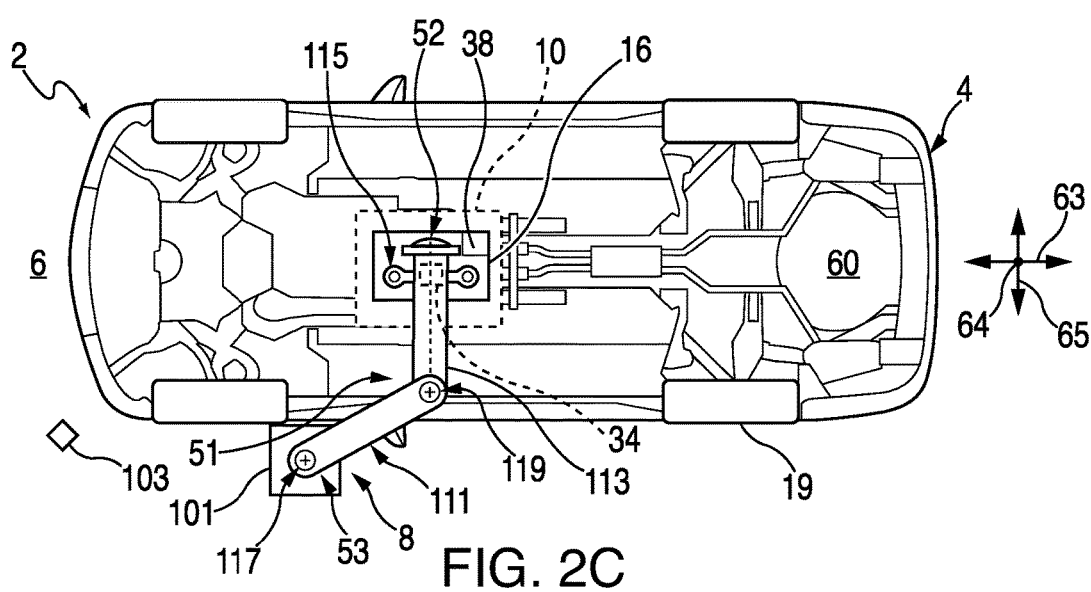
Figure 3:
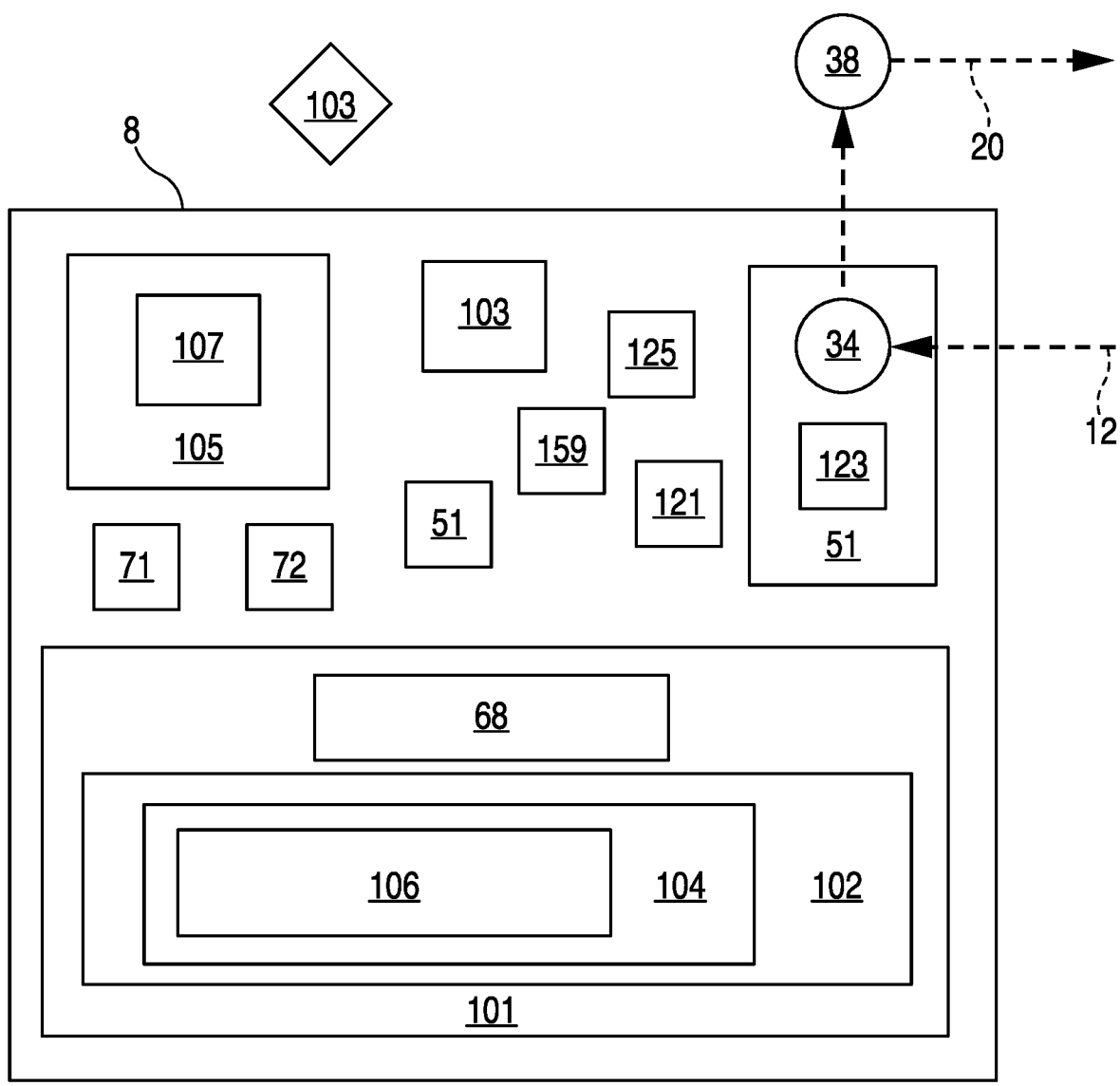
FIG. 3 is a block diagram illustrating aspects of the automatic charging device (ACD) of FIGS. 2A-2C according to embodiments of the disclosure
Figure 4:
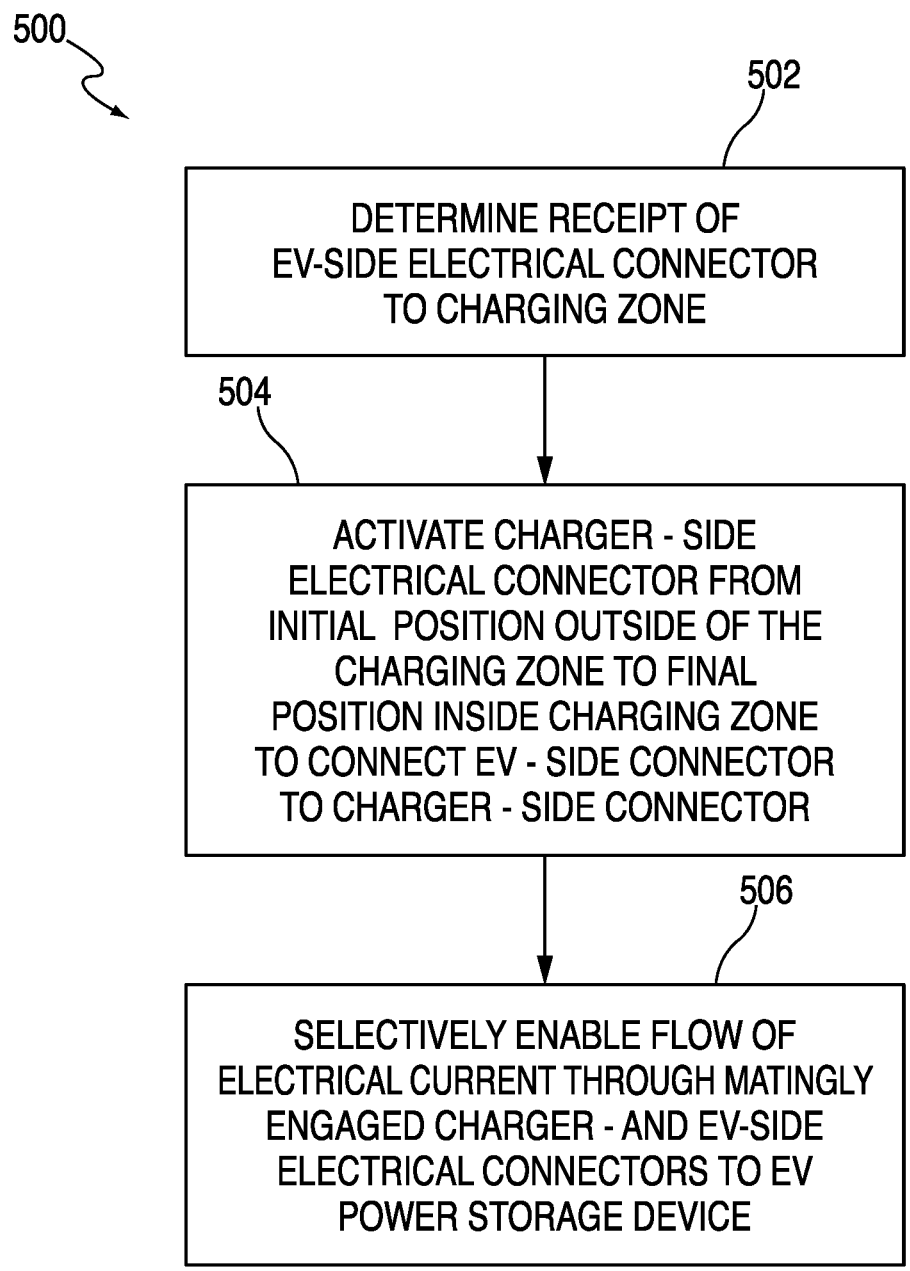
FIG. 4 is a flow chart illustrating steps of a method for charging an EV using the ACD of FIGS. 2A-2C and 3 according to an embodiment of the disclosure.
Figure 5:
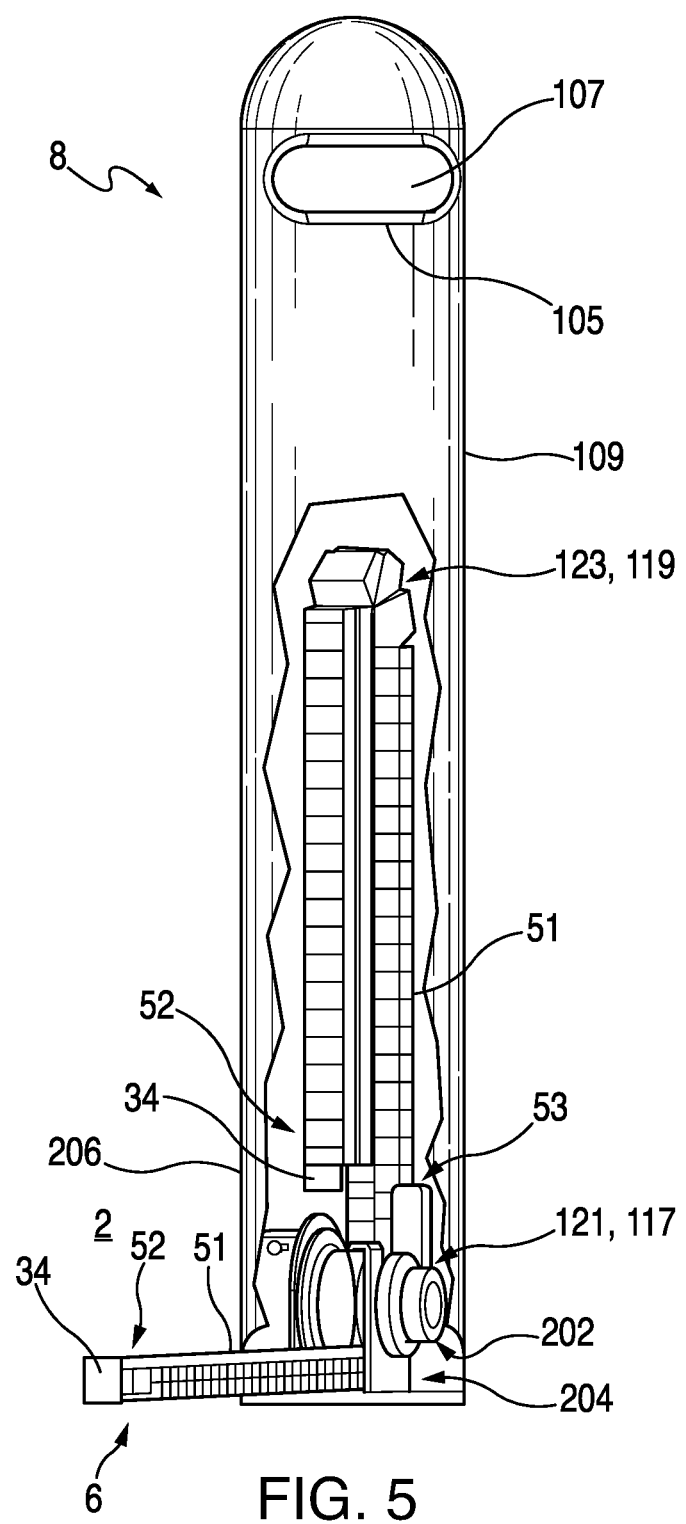
FIG. 5 is a schematic diagram illustrating aspects of the ACD of FIGS. 2A-2C and 3 according to embodiments of the disclosure.
Figure 6:
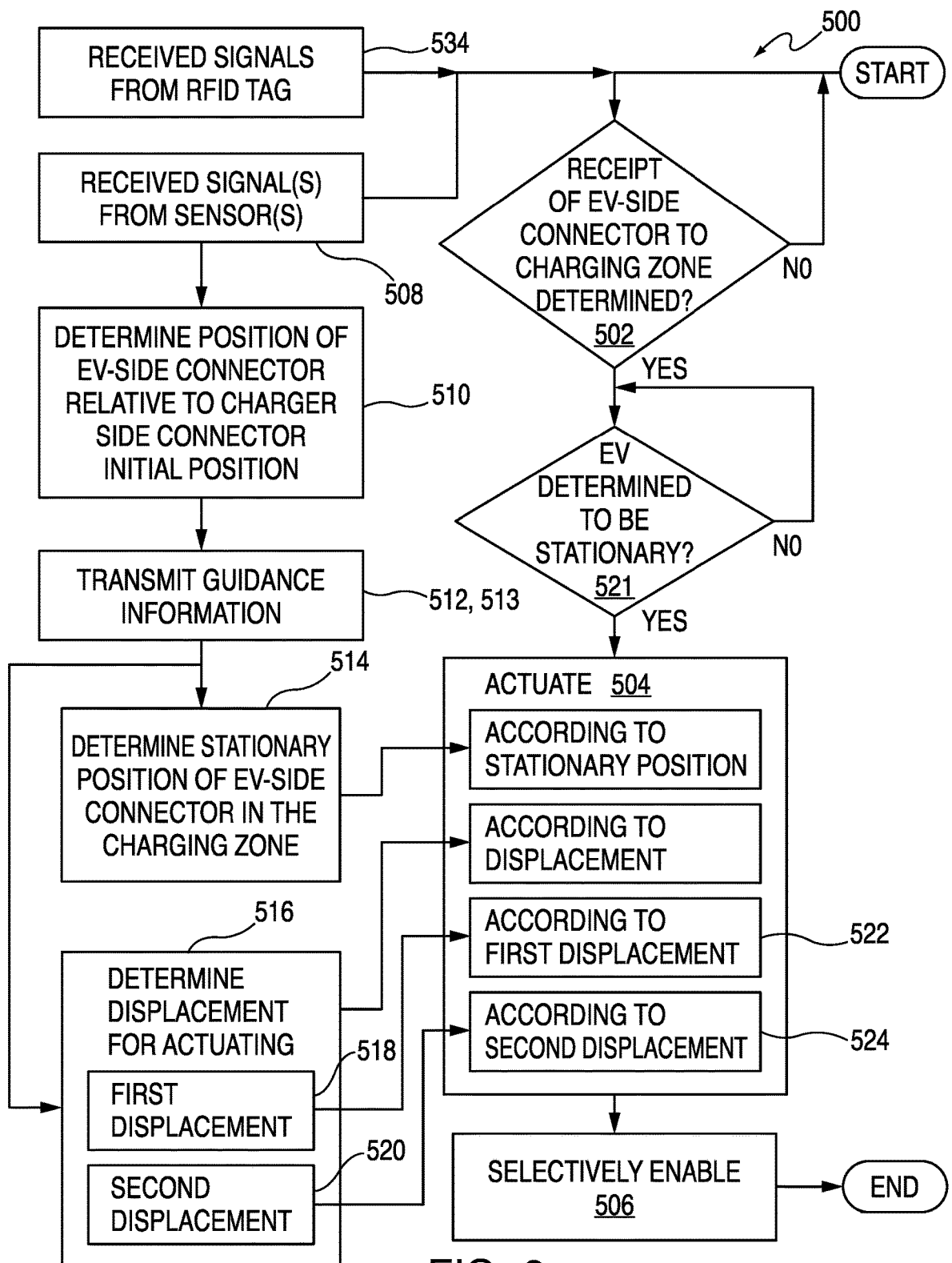
FIG. 6 is a flowchart of aspects of the method of FIG. 4 according to embodiments of the disclosure.

FIGS. 2A, 2B and 2C are respectively side, front and underside 60 plan view schematic diagrams of the charging environment 2 shown in FIG. 1 with the EV 4 underside 60 positioned over the charging zone 10, according to an embodiment of the disclosure. FIG. 3 is a block diagram illustrating aspects of an automatic charging device (ACD) 8 of FIGS. 2A-2C according to embodiments of the disclosure. FIG. 4 is a flow chart illustrating steps of a method 500 for charging an EV (e.g., EV 4) using the ACD 8 of FIGS. 2A-2C and 3 according to an embodiment of the disclosure. FIG. 5 is a schematic diagram illustrating aspects of the ACD of FIGS. 2A-2C and 3 according to embodiments of the disclosure. FIG. 6 is a flowchart of aspects of the method 500 of FIG. 4 according to embodiments of the disclosure. Any or all of the steps of method 500 described herein are implemented and performed, at least in part, by the ACD 8.

ACD 8 includes a housing 109 for positioning on for instance, the ground surface 6 of EV 4 charging environment 2. Housing 109 can be embodied in any shape including a post, as shown in the embodiment illustrated in FIGS. 2A-2C and 5. The post is coupled to the ground surface 6 and extends upward (e.g., along a perpendicular axis 64 with respect to ground surface 6), as shown in FIGS. 2A, 2B and 5. In the illustrated example, post is positioned on ground surface 6 such that, when EV 4 is positioned in environment 2 with its EV-side electrical connector 38 positioned in vehicle unit 16 opposite ground surface 6 and over charging zone 10, EV 4 does not contact post or other components of ACD 8 as described herein. Similarly, the post housing 109 of ACD 8 is situated in environment 4 so as to minimize a likelihood that EV 4 will contact any part of ACD 8 when being driven toward and away from charging zone 10 (e.g., along longitudinal 63 and transverse 65 axes of the EV 4). In some embodiments, the post housing 109 is positioned in environment 2 proximal to, but not within, an EV 4 parking spot footprint. In examples where charging environment 2 includes multiple EV 4 parking spots, the post housing 109 is advantageously positioned or otherwise install in environment 2 so that two or more EVs 4 may be serviced by the ACD 8 according to the disclosed method 500. In an example, a height of post housing 109 is equal to, or approximately, four feet tall, with this height either inclusive, or exclusive, of HMI 5 and/or sensor(s) 103 positioned atop post. Alternative heights for post are selected according to specific applications of ACD 8 in charging environment 2. For example, and without limitation, where the EVs 4 are buses, a post having a height of greater the four fee may be selected for ACD 8 to facilitate HMI 105 being viewable by drivers of the electric buses.

In one embodiment, ACD 8 is portable or semi-portable. In an example, ACD 8 has wheels (e.g., caster wheels) or roller balls (not shown) operably coupled to a portion of housing 109 so as to make contact with ground surface 6. This allows a user of ACD 8 to move ACD 8 about charging environment 2 as needed. For instance, in a garage having parking spaces for two or more EVs 4, an ACD 8 user may move the ACD 8 from a first point of use proximal one parking space for a first EV 4 to at least a second point of use proximal at least a second parking space for at least a second EV 4. In the example, ACD 8 may include a cable for connecting the charger-side electrical connector 34 to a standard AC outlet in the garage, and ACD 8 may further include an AC-to-DC power converter to provide DC power for EV 4 charging operations according to the disclosed method 500. The wheels or roller balls of ACD 8 embodied in portable or semi-portable form factors may have additional hardware for lifting and lowering the ACD 8 above and back onto ground surface 6 so as to facilitate alternately enabling the ACD 8 to be rolled about, and to remain stationary on, ground surface 6, respectively. In an example, such additional hardware associated with, for instance, the ACD 8 wheels or roller balls, include quick-release floor connections and casters for multiple-vehicle use. A person having ordinary skill in the art will recognize and appreciate that, in addition to the ACD 8 and/or housing 109 form factors provided herein, any and all present, and yet to be contemplated, form factors that are capable of housing and providing structural support for ACD 8 components for use in method 500 may, without undue experimentation, be employed for use in the disclosed method 500 using, e.g., ACD 8. Practice of method 500 using, for instance, ACD 8, with any such form factors is thus intended to fall within the scope of the present disclosure and the scope of the appended claims.

ACD 8 includes a charger link 51 having a distal end 52 and a proximal end 53. A charger-side electrical connector 34 is operably coupled to the charger link 51 at or proximal to the distal end 52 of the charger link 51. ACD 8 includes at least one actuator for alternately moving the charger link 51 distal end 52 toward and away from EV-side electrical connector 38. In some embodiments, connector 34 is present in or on EV 4 underside 60 in a fixed position, or otherwise situated in or on vehicle unit 16 so as to facilitate access by connector 34 according to the disclosed method 500. In an example, one or more of the actuator(s) is a multi-degree of freedom actuator that, along with suitable mechanical linkages, provide for actuation of charger link 51 and/or charger-side electrical connector 34 either continuously or discontinuously along at least two of axes 63, 64, and 65 in method 500 to facilitate the electrical coupling of connector 34 with EV-side electrical connector 38. In one embodiment, a wheeled (or roller balled) truck mechanism 115 is coupled to the charger link 51 distal end 52 to support charger link 51 on ground surface 60, and to facilitate smooth movement along ground surface 6 during such times that charger link 51 and charger-side electrical connector 34 is being actuated toward and/or away from EV-side electrical connector 38 in method 500, as described in greater detail below. In the embodiment illustrated in FIGS. 2A-2C, a lift mechanism 114 (e.g., scissor lift) is operably coupled to the distal end 52 of charger link 51. Upon being positioned in the charging zone 10, one or more lift actuators (not shown) coupled in communication with, and under the control of, ACD 8 controller 101 elevate the charger-side electrical connector 34 to the EV-side electrical connector 38 to facilitate accomplishing the mating coupling between connector 34 and connector 38 according to the disclosed method 500.

In the example shown in FIGS. 2A-2C, charger link 51 is a two-piece link 51 having first 111 and second 113 link pieces (e.g., a first and at least a second piece). The first link 111 is rotatably coupled to a portion of ACD 8 (e.g., at least a portion of post housing 109) by way of a first revolute joint 117 and the second link piece 113 is rotatably coupled to the first 111 by way of a second revolute joint 119. In the example embodiment, ACD 8 includes at least two actuators. A first actuator 121 is operably coupled to the first link piece 111 proximal the first revolute joint 117, and a second actuator 123 is operably coupled to the first link piece 111 proximal the first revolute joint 117. In examples where charging environment 2 includes multiple EV 4 parking spots, ACD 8 may include two or more charger links 51 with respective connectors 34 to facilitate a single ACD 8 simultaneously charging or otherwise servicing two or more EVs 4 according to the disclosed method 500. A person having ordinary skill in the art will recognize and appreciate that, in addition to the examples of sensors 103 provided herein, any and all present, and yet to be contemplated, configurations for a single- or multi-piece charger link 51 that are capable of being directly or indirectly actuated by any and all present, and yet to be contemplated, actuation devices and techniques, may, without undue experimentation, be employed for use in the disclosed method 500. Practice of method 500 using, for instance, ACD 8, with any such actuator(s) and/or charger linkage device configurations is thus intended to fall within the scope of the present disclosure and the scope of the appended claims.

ACD 8 includes one or more sensors 103 mounted on, or positioned inside, housing 109. The housing 109 (e.g., post) provides structural support for sensor(s) 103. As described in greater detail below by way of examples, housing 109 forms a mechanical base and/or stowing location for the charger link 51 and/or charger-side electrical connector 34 of ACD 8. In some embodiments, such as shown in FIGS. 2A-2C, one or more sensors 103 are positioned in EV 4 charging environment 2 outside of the housing 109. Whether they be included in or on ACD 8, or positioned outside of ACD 8 housing 109, sensor(s) 103 utilized in the disclosed method 500 include any combination of: cameras and/or other imaging devices (e.g., for still image and/or video capture), radio frequency identification (RFID) readers (e.g., transceiver 71), rangefinders (e.g., laser-based), and acoustic proximity sensors). In any event, sensor(s) 109 are positioned in EV 4 charging environment 2 for obtaining data representative of a position of EV 4 and thus, of the EV-side electrical connector 38 relative to ACD 8 and therefore, also relative to charger-side electrical connector 34. For example, ACD 8 is installed in EV 4 charging environment 2 in a fixed position relative to charging zone 10 (e.g., a center point and/or the corners thereof). As described in greater detail below by way of examples, with the EV-side electrical connector 38 positioned in or on EV 4 (e.g., in or on vehicle unit 16 positioned in or on EV 4 underside 60) in a fixed location, and where this fixed location of connector 38 is known to ACD 8 along with dimensions along axes 63, 64 and/or 65 between connector 38 and one or more points, regions, areas, or other features of EV 4, use of sensor(s) 103 by ACD 8 in enables accurate and precise localization of the EV 4 and its connector 38 for purposes of executing the method 500 disclosed herein. A person having ordinary skill in the art will recognize and appreciate that, in addition to the examples of sensors 103 provided herein, any and all present, and yet to be contemplated, sensors that are capable of directly or indirectly obtaining, processing, and/or transmitting data representative of EV 4 and/or EV-side electrical connector 38 position(s) in charging environment 2 may, without undue experimentation, be employed for use in the disclosed method 500. Practice of method 500 using, for instance, ACD 8, with any such sensor(s) is thus intended to fall within the scope of the present disclosure and the scope of the appended claims.

ACD 8 includes at least one human machine interface (HMI) 105 mounted or otherwise positioned on or in housing 109, such as atop post, as shown in FIGS. 2A and 2B. In some embodiments, HMI(s) 105 are positioned in EV 4 charging environment 2 outside of the housing 109. HMI 105 includes a display device 107 visible to an EV 4 driver or other user(s) of ACD 8 during use of ACD 8. Additionally, or instead, HMI 105 includes any combination of: status monitors, speakers, and wireless and/or wired communication hardware (e.g., communicatively coupled with transceiver 71). Whether included in or on ACD 8, or positioned outside of ACD 8 housing 109, HMI 105 is utilized in the disclosed method 500 to facilitate guiding the EV 4 driver on approach to and/or in departing from charging zone 10, as described in greater detail below by way of examples. In some embodiments, HMI 105 provides ACD 8 users a means to control various aspects of an EV 4 charging process during operation of ACD 8 according to the disclosed method 500. A person having ordinary skill in the art will recognize and appreciate that, in addition to the examples of HMIs 105 and displays 107 provided herein, any and all present, and yet to be contemplated, HMIs, display devices, and other physical or virtual reality-based devices and techniques that are capable of directly or indirectly facilitating guiding the EV 4 driver on approach to and/or in departing from charging zone 10 in charging environment 2 may, without undue experimentation, be employed for use in the disclosed method 500. Practice of method 500 using, for instance, ACD 8, with any such guidance devices and techniques is thus intended to fall within the scope of the present disclosure and the scope of the appended claims.

ACD 8 is or includes the charging equipment discussed above with reference to FIG. 1. In addition to the several aforementioned components, in some embodiments, ACD 8 includes a switch 125 or other device operably coupled to an interface 159, where the interface 159 includes, for example and without limitation, an electrical bus or other circuit connection means to the power source for charging the EV 4 according to the disclosed method 500. The switch 125 is operable manually and/or on command to alternately enable and disable, and in some embodiments, to regulate, the flow (12, 20) of electrical current from the power source (e.g., utility grid) for purposes of charging the EV 4 according to the disclosed method 500 using, e.g., ACD 8. A person having ordinary skill in the art will recognize and appreciate that, in addition to the examples of switches 125 and interface 159 provided herein, any and all present, and yet to be contemplated, switches and interfaces, and related techniques, that are capable of directly or indirectly enabling, disabling and/or regulating the flow (12, 20) of current for use in method 500 to charge and/or discharge EV 4 power storage device 18 may, without undue experimentation, be employed for use in the disclosed method 500. Practice of method 500 using, for instance, ACD 8, with any such electric current enabling, disabling and/or regulating devices and techniques is thus intended to fall within the scope of the present disclosure and the scope of the appended claims.

ACD 8 includes at least one controller 101 for implementing, performing, or otherwise facilitating at least one of the disclosed steps of method 500. Controller 101 is operatively coupled in communication with the above-described components of ACD 8 including the: switch 125, actuator(s) 121 and/or 123, sensor(s) 103, a transmitter 72 (or instead, or alternatively, transceiver 71 having both transmitting and receiving functionality), HMI 105, display device 107, and such other components positioned in, on, or external to ACD 8 to facilitate its operation in method 500. In some embodiments, processor 68 is communicatively coupled with a smartphone or other personal computing device to facilitate operation of ACD 8 by an EV 4 driver or other ACD 8 user for example, and without limitation, by way of an "app." In one embodiment, the controller 101 is or includes at least one processor 68 coupled in communication with at least one memory device 102 for reading, writing, modifying, and/or deleting data for use in method 500. Processor 68, the above-described components positioned in, on, or external to ACD 8, and, in some cases, memory 102 are also operably coupled to an electric power source (not shown). As used herein, the term "operably coupled in communication" means that two or more hardware components of the disclosed ACD 8 are capable of transmitting and/or receiving electrical and/or optical signals to and/or from each other. Such signals are capable of encoding data of various types and for various purposes related to performance of method 500 according to the disclosure. This transmitting and/or receiving includes using either wired, wireless, or both types of data connections and/or data communication protocols. This transmitting and/or receiving also includes transmitting and/or receiving electrical and/or optical signals either over very short distances (e.g., within the confines of the ACD 8 unit) and/or over comparatively much larger distances (e.g., transmitting and/or receiving data via the Internet or via satellites). In the latter case, ACD 8 may include one or more communication interfaces (e.g., transceiver 71 to communicate with computing and/or memory resources (e.g., server(s)) via wired or wireless communication networks and protocols including, for example, to carry out one or more steps of method 500 as described herein. A person having ordinary skill in the art will recognize and appreciate that any and all present, and yet to be contemplated wired and/or wireless data communication methods and protocols may, without undue experimentation, be employed for use in the disclosed method 500. Practice of method 500 using, for instance, ACD 8, with any such data communication methods and protocols is thus intended to fall within the scope of the present disclosure and the scope of the appended claims.

In one embodiment, memory 102 includes at least one non-transitory computer-readable storage medium 104 which store(s) program instructions (e.g., in the form of software 106 and/or firmware). In such embodiments, when executed by processor 68, the program instructions cause the processor 68, and/or the disclosed ACD 8 and its components, to implement, perform, and/or otherwise facilitate, at least in part, one or more of the steps of method 500, as disclosed herein. Memory 102 includes one or more data structures (not shown). Data structures in memory 102 store data received directly or indirectly from processor 68 during the course of performance of method 500. The data received and stored in data structure includes data input from users, servicers, developers, and/or administrators of ACD 8 to facilitate operation of ACD 8 in method 500.

Referring to FIG. 4, in method 500, controller 101 determines 502, using sensor(s) 103, receipt of the EV 4, and thus also the EV-side electrical connector 38, to the charging zone 10 of EV 4 charging environment 2. Controller 101 determines 502 the receipt of EV-side electrical connector 38 charging zone 10 based on at least one signal received 508 (e.g., by way of transceiver 71) by controller 101 from sensor(s) 103 that is/are representative of a position of EV 4 and/or EV-side electrical connector 38 in charging environment 2. As EV 4 moves about environment 2 on its way toward or away from charging zone 10, sensor(s) 103 capture and transmit the positional data continuously and/or at predetermined intervals of time so as to provide controller 101 the positional data for use in method 500 in (or near) real time. In some embodiments, the determining 502 step is performed iteratively until such time that the EV-side electrical connector 38 is received in the charging zone 10. In embodiments where controller 101 is or includes processor 68, processor 68 causes the captured and received 508 sensor 103 positional data to be stored in transitory (a.k.a. volatile, e.g., RAM) and/or non-transitory (a.k.a. non-volatile, e.g., ROM) memory 102 for further use in method 500. In embodiments in which the determining 502 and/or receiving 508 steps of method 500 is/are performed, implemented, and/or facilitated, at least in part using software 106 or firmware, processor 68 executes program instructions respectively stored as a charging zone receipt determining and/or data receiving module(s) in the non-transitory computer-readable storage medium 104. Providing software 106 or firmware in a modular design is useful for purposes such as troubleshooting, maintenance, and providing updates for ACD 8, as used in method 500 for example.

In method 500, controller 101 uses the actuator(s) (121 and/or 123) to actuate 504 the charger-side electrical connector 34 from an initial position outside of the charging zone 10 (and, e.g., proximal ACD 8 housing 109) to a final position inside of the charging zone 10 (e.g., distal ACD 8 housing 109). The final position of connector 34 corresponds to the charger-side electrical connector 34 matingly engaged with the EV-side electrical connector 38. In embodiments where controller 101 is or includes processor 68, and in which the actuating 504 step of method 500 is performed, implemented, and/or facilitated, at least in part using software 106 or firmware, processor 68 executes program instructions stored as an actuating module in the non-transitory computer-readable storage medium 104. According to some embodiments, actuating 504 the charger-side electrical connector 34 from the initial position to the final position, and likewise back to the initial position from the final position, necessarily includes actuating one or more portions and/or pieces of the changer link 51 having the charger-side electrical connector 34 positioned at, or proximal to, its distal end 52.

In one embodiment, in method 500, the controller 101 actuates 504 the charger-side electrical connector 34 from the initial to the final position in response to determining 502 receipt of the EV-side electrical connector 38 to the charging zone 10. In one example, the at least one signal received 508 by controller 101 is further representative of motion (or lack thereof) of the EV 4 in charging environment 2. In the example, controller 101 determines 521 that the EV 4 is stationary in charging environment 2 based on such motion-indicative signal(s). Where controller 101 is or includes processor 68, processor 68 causes the captured and received 508 sensor 103 motion data to be stored in memory 102 for further use in method 500. In embodiments in which the determining 521 step of method 500 is performed, implemented, and/or facilitated, at least in part using software 106 or firmware, processor 68 executes program instructions stored as a motion determining module in the non-transitory computer-readable storage medium 104. In an embodiment, controller 101 actuates 504 the charger-side electrical connector 34 in response to determining 521 that the EV 4 is stationary. In the embodiment, conditioning any movement of ACD 8 components such as charger link 51 and connector 34 on the EV-side electrical connector 38 being in the charging zone 10 provides added assurance for EV 4 driver safety and for mitigation of risk of damage to EV 4, ACD 8, and/or the facility in which ACD 8 is operating.

In an embodiment, in method 500, the signal(s) received 508 by the controller 101 from sensor(s) 103 are further representative of a position of the EV 4, and thus the EV-side electrical connector 38, outside of the charging zone 10. In an example, controller 101 determines 510 a position of the EV-side electrical connector 38 relative to the initial position of the charger-side electrical connector 34. In an example, the initial position of connector 34 is fixed after installation of ACD 8 in environment 2 and is thus made to be known to controller 101 (e.g., it is stored in memory 102) as, for instance, fixed distances from charging zone 10 (e.g., from a center, or corners, thereof) along axes 63, 64 and/or 65 where charging zone 10 is also in a fixed location in environment 2 on ground surface 6. In some embodiments, EV 4 includes an RFID tag 40 and transceiver 71 of ACD 8 includes RFID reading functionality. In an example, in method 500, controller 101 receives 534, via transceiver 71, signals from RFID tag 40 encoding data representative of a fixed position of EV-side electrical connector 38 in or on EV 4. This received 534 data includes information related to EV 4 characteristics (e.g., make and model, VIN, driver identity, etc.), dimensions (length, width, wheel base, ground clearance, etc.) and operational specifications (e.g., maximum steering angles and/or radius). Thus, in the example, and in conjunction with receiving 508 EV 4 positional data from sensor(s) 103 according to the method 500 disclosed herein, the received 534 EV 4-related data enables controller 101 to track the position of EV-side electrical connector 38 in environment 2 based on tracking the position of any point, region, and/or area (e.g., on an exterior surface) of EV 4. Where controller 101 is or includes processor 68, processor 68 causes the captured and received 508 sensor 103 extra-charging zone 10 positional data, and/or the received 534 data, to be stored in memory 102 for further use in method 500. In embodiments in which the determining 510 and/or receiving 534 steps of method 500 is/are performed, implemented, and/or facilitated, at least in part using software 106 or firmware, processor 68 executes program instructions stored as extra-charging charging zone position determining and/or EV data receiving module(s) in the non-transitory computer-readable storage medium 104. In an embodiment, controller 101 actuates 504 the charger-side electrical connector 34 in response to determining 521 that the EV 4 is stationary. In the embodiment, conditioning any movement of ACD 8 components such as charger link 51 and connector 34 on the EV 4 being stationary provides added assurance for EV 4 driver safety and for mitigation of risk of damage to EV 4, ACD 8, and/or the facility in which ACD 8 is operating.

In one embodiment, in method 500, controller 101 uses the HMI 105 to transmit 512 visual and/or audible guidance information to the charging environment 2. In an example, the transmitting 512 step, and the guidance information transmitted 512 thereby, is performed by controller 101 based on the determined 510 position. For instance, where, as determined by controller 101 according to the disclosed method 500, the EV 4 is approaching charging zone 10 along a trajectory requiring adjustment along axis 65, controller 101 causes HMI 105 to transmit 512 (e.g., by way of display device 107) left or right lighting or graphics (e.g., directional arrows) respectively positioned on left and rights sides of the HMI as view by a human EV 4 driver, as illuminated features or as displayed graphics (e.g., as an optical landmark for EV 4 driver). Alternatively, or instead, the illuminated features or displayed graphics may include textual or graphical symbols directing the human EV 4 driver to brake and/or continue to drive EV 4 either in forward or reverse directions. In the example, an EV 4 driver viewing and/or hearing the transmitted 512 guidance information may course correct to facilitate EV-side electrical connector 38 being received in the charging zone 10. In embodiments where the HMI 105 is positioned outside of the ACD 8 housing 109, HMI 105 is wirelessly communicatively coupled with controller 101 (e.g., by way of transceiver 71). In another example, ACD 8 may include assistive devices (not shown in the drawings) to effectively transmit 512 the guidance information to vision- and/or hearing-disabled ACD 8 users in method 500. In the embodiment, transmitting 512 the guidance information to environment 2 facilitates receipt of the EV 4, and thus the EV-side electrical connector 38, to the charging zone 10, and further enhances operational safety by preventing, or at least mitigating the risk of, collisions between EV 4 and ACD 8.

In one embodiment, the EV 4 is an autonomous, or semi-autonomous, EV 4. In the embodiment, in method 500, controller 101 uses the transmitter 72 (or the transceiver 71) to transmit 513 EV 4 navigation guidance information to the autonomous vehicle driving control system 15. In an example, the transmitting 513 step, and the guidance information transmitted 513 thereby, is performed by controller 101 based on the determined 510 position. For instance, where, as determined by controller 101 according to the disclosed method 500, the autonomous EV 4 is approaching charging zone 10 along a trajectory requiring adjustment along axis 65, controller 101 causes transmitter 72 to transmit 513 (e.g., by way of wireless signals encoding the transmitted 513 guidance information) data which, upon receipt by the autonomous vehicle driving control system 15, cause system 15 to take corrective action in the form of one or more of steering, throttle adjustment, and braking, to facilitate positioning EV-side electrical connector 38 in the charging zone 10. In the example, transmitting 513 the guidance information to the autonomous vehicle driving control system 15 in this manner enables the autonomous EV 4 to course correct to facilitate EV-side electrical connector 38 being received in the charging zone 10. In the embodiment, transmitting 513 the guidance information to autonomous vehicle driving control system 15 facilitates receipt of the autonomous or semi-autonomous EV 4, and thus the EV-side electrical connector 38, to the charging zone 10, and further enhances operational safety by preventing, or at least mitigating the risk of, collisions between EV 4 and ACD 8. Furthermore, the transmitting 513 step further facilitates maximizing parking density of autonomous or semi-autonomous EVs 4 in parking facilities such as garages and parking lots as used, for example and without limitations, for fleet and other commercial vehicle operations. In embodiments where controller 101 is or includes processor 68, and in which the transmitting 512 and/or transmitting 513 step(s) of method 500 is/are performed, implemented, and/or facilitated, at least in part using software 106 or firmware, processor 68 executes program instructions stored as EV driver guidance information transmitting and/or autonomous EV navigational guidance information transmitting module(s) in the non-transitory computer-readable storage medium 104.

In an embodiment, in method 500, the signal(s) received 508 by the controller 101 from sensor(s) 103 are further representative of a position of the EV 4, and thus the EV-side electrical connector 38, inside of the charging zone 10. In an example, controller 101 determines 514 the stationary position of the EV-side electrical connector 38 in charging zone 10 based on such intra-charging zone 10-indicative signal(s). In an example, controller 101 determines 514 the stationary intra-charging zone 10 position of the EV-side electrical connector 38 relative to the initial position of the charger-side electrical connector 34. In embodiments where, as discussed above, the initial connector 34 position and the position of charging zone 10 are fixed and known to controller 101, the determining 514 step includes determining fixed distances of connector 34 from one or both of the center and corners of charging zone 10 along axes 63, 64 and/or 65. Where controller 101 is or includes processor 68, processor 68 causes the captured and received 508 sensor 103 intra-charging zone 10 positional data to be stored in memory 102 for further use in method 500. In embodiments in which the determining 514 step of method 500 is performed, implemented, and/or facilitated, at least in part using software 106 or firmware, processor 68 executes program instructions stored as an extra-charging zone position determining module in the non-transitory computer-readable storage medium 104. In an embodiment, controller 101 actuates 504 the charger-side electrical connector 34 in response to determining 514 that the EV-side electrical connector 38, is positioned in the stationary intra-charging zone 10 position. In the embodiment, conditioning any movement of ACD 8 components such as charger link 51 and connector 34 on the EV-side electrical connector 38 being in the intra-charging zone 10 position provides added assurance for EV 4 driver safety and for mitigation of risk of damage to EV 4, ACD 8, and/or the facility in which ACD 8 is operating.

In one embodiment, in method 500, controller 101 determines 516 a displacement for actuating 504, using the actuator(s) (121 and/or 123), the charger-side electrical connector 34 from the initial to the final position. In an example, controller 101 determines 516 the displacement based on the determined 514 stationary position of the EV-side electrical connector 38 inside of the charging zone 10. In embodiments where, as discussed above, the initial connector 34 position and the position of charging zone 10 are fixed and known to controller 101, the determining 516 step includes determining one or displacement distances (and/or vector distance(s), velocity(ies), and/or acceleration(s)) along axes 63, 64 and/or 65 for actuating 504 charger link 51, and thus also connector 34, to the determined 514 stationary position of EV-side electrical connector 38 inside charging zone 10. In embodiments where actuator(s) (e.g., 121 and/or 123) have multi-degree of freedom actuation functionality, determining 516 the displacement in method 500 includes determining a plurality of displacements for implementation by multi-degree of freedom actuator(s) for continuously or discontinuously actuating 504 charger link 51 and connector 34 from the initial to the final position. Where controller 101 is or includes processor 68, processor 68 causes the determined 516 displacement(s) to be stored in memory 102 for further use in method 500. In embodiments in which the determining 516 step of method 500 is performed, implemented, and/or facilitated, at least in part using software 106 or firmware, processor 68 executes program instructions stored as a displacement determining module in the non-transitory computer-readable storage medium 104.

In method 500, the controller 101 uses the actuators (e.g., 121 and/or 123) to actuate 504 the charger-side electrical connector 34 according to the determined 516 displacement(s). Where the charger link 51 is embodied in at least a two-piece charger link, in method 500, the controller 101 determines 516 the (e.g., overall) displacement by determining 518 a first displacement of and for the first piece, and determining 520 at least a second displacement of and for the at least a second piece. In such embodiments, in method 500, the controller 101 actuates 504 the charger-side electrical connector 34 by actuating 522, using, e.g., the first actuator 121, the first piece according to the determined 518 first displacement and actuates 524, using, e.g., the at least a second actuator 123, the at least a second piece according to the determined 520 at least a second displacement. In any event, accurately and precisely determining 516 the displacement(s) for use in the actuating 504 step of method 500 facilitates safe and efficient movements of charger link 51 and charger-side electrical connector 34 from the initial to final positions, including through a series of intermediate positions, in a manner to prevent, or at least mitigate, undesirable contact of charger link 51 and/or connector 34 with the facility in which ACD 8 is installed and/or unintended portions of EV 4 (e.g., portions thereof other than EV-side electrical connector 38).

In an embodiment, upon the charger-side electrical connector 34 being actuated 504 to its final position in method 500, the controller 101 uses switch 125 to selectively enable 506 the flow of electric current (12, 20) from the power source (e.g., utility grid) through the matingly engaged charger-side 34 and EV-side 38 electrical connectors to a power storage device 18 of the EV 4. In an example, the selectively enabling 506 step in method 500 includes initiating, by the controller 101, an EV 4 charging process. Alternatively, or instead, upon the charger-side electrical connector 34 being actuated 504 to its final position in method 500, the controller 101 uses switch 125 to selectively enable 506 the electric current flow (12, 20) from the power storage device 18 to the power source (e.g., utility grid), thereby initiating an EV 4 discharging process. In such embodiments, without undue experimentation, ACD 8 and method 500 are utilized for selling electric power from the power storage device 18 back to the grid, or in some embodiments, for using power storage device 18 for provisioning electric power to one or more loads of, for instance, an ACD 8 user's home (e.g., appliances, lights, motors, etc.). In embodiments in which the selectively enabling 506 step of method 500 is performed, implemented, and/or facilitated, at least in part using software 106 or firmware, processor 68 executes program instructions stored as an EV charging and discharging initiating module in the non-transitory computer-readable storage medium 104.

In one embodiment, in method 500, the at least one signal received 508 by controller 101 is further representative of completion of the EV 4 charging (or discharging, as the case may be) process. In an example, sensor(s) 103 include devices (e.g., voltmeters, ammeters, etc.) positioned in, or external to, ACD 8 (e.g., proximal battery 18, switch 125, and/or battery 18) for obtaining, processing, and/or transmitting data representative of electrical parameters relating directly or indirectly to, for example, a state of charge or battery 18. In the embodiment, the controller 101 determines a presence of one or more conditions representative of completion of the EV charging (or discharging) process based on the electrical parameter-related data received 508 from sensor(s) 103. In an example, in method 500, controller 101 uses actuators (121 and/or 123) to actuate the charger-side electrical connector 34 from the final position to the initial position in response to determining the presence of one or more conditions representative of completion of the EV charging (or discharging) process. In another embodiment, an ACD 8 user may interact with HMI 105 to terminate the EV charging (or discharging) process at any time when, for example, he or she desires to drive the EV 4 away from the ACD 8.

To further illustrate aspects of the embodiments described above, the following use cases are presented and discussed below with reference to FIGS. 1-6.

Example 1

Atop post housing 109 is an HMI 105 consisting of a touchscreen display 107 and speakers. Cameras or other sensors 103 are be mounted on top or long the post. Motion sensors 103 activate (e.g., wake up) controller 101 of ACD 8, which takes the form of processor 68. Then, HMI 105 starts to display, on display device 107, the relative position of the approaching EV 4 and/or EV-side electrical connector 38 relative to the charging zone 10 (e.g., a center point thereof). Using the known EV 4 geometry (e.g., wheel base between pairs of wheels 19 and/or maximum steering angles) and dimensions in axes 63, 64, and/or 65 between connector 38 and a point or set of points on EV 4 in view of sensor(s) 103, the HMI 105 displays left-right steering and accelerator and brake commands to the driver. The commands provide guidance information to facilitate the driver to conduct the EV 4 to a resting (e.g., stopped) position in which automated positioning of, and connection between, the charger-side 34 and EV-side 38 electrical connectors is accomplished according to the disclosed method 500 using ACD 8.

Once the EV 4 is stopped, the ACD 8 automatically deploys the charger link 51 to position the charger-side electrical connector 34 near the vehicle unit 16 so that an electrical connection can be automatically made between the charger-side 34 and EV-side 38 electrical connectors according to the disclosed method 500 using ACD 8.

Example 2

The ACD 8 housing 109 (e.g., post) defines an at least partially enclosed cavity 202, as shown in FIG. 5. In the example, the housing 109 has an opening 204 permitting access to the charging environment 2 from the cavity 202. The cavity 202 enables stowing and storage of, for example, the two-piece charger link 51 when not in use for method 500. The housing 109 includes a door 206 that is movable from a closed to an open position using one or more door actuators (not shown in FIG. 5) on command of controller 101 or an ACD 8 user. In the example, the initial position of the charger side electrical connector 34 corresponds to a stowed position of the charger link 51 and/or the charger-side electrical connector 34 at least partially inside of the cavity 202. In this Example 2, for method 500, the controller 101 actuates 504 the charger-side electrical connector 34 by actuating 504 it from the initial to the final position through the opening 202 and, in some embodiments, after causing the door 206 to be opened. For instance, controller 101 causes the door 206 to be opened in response to determining 502 receipt of the EV-side electrical connector 38 to the charging zone 10 of EV 4 charging environment 2. Providing housing 109 with cavity 202 for stowing charger link 51 and/or charger-side electrical connector 34 when not in use for method 500 minimizes the footprint of ACD 8 in charging environment 2 so as to maximize other use of available space therein.

Example 3

Figure 7A:
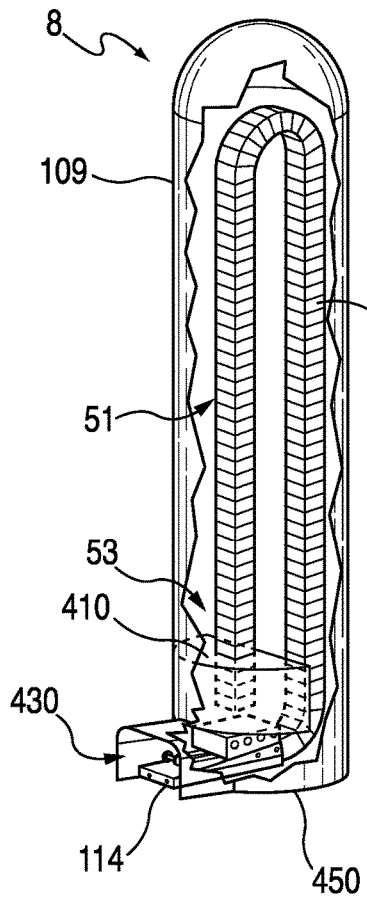
FIGS. 7A-7C are schematic diagrams illustrating aspects of the ACD of FIGS. 2A-2C and 3 according to embodiments of the disclosure.
Figure 7B:
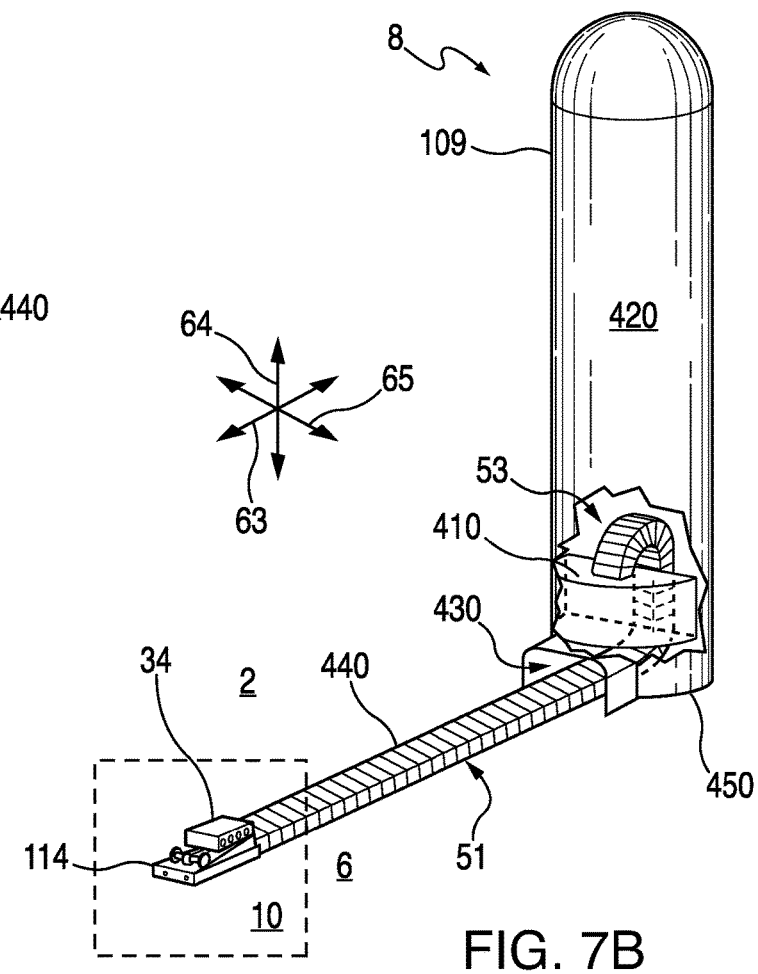
Figure 7C:
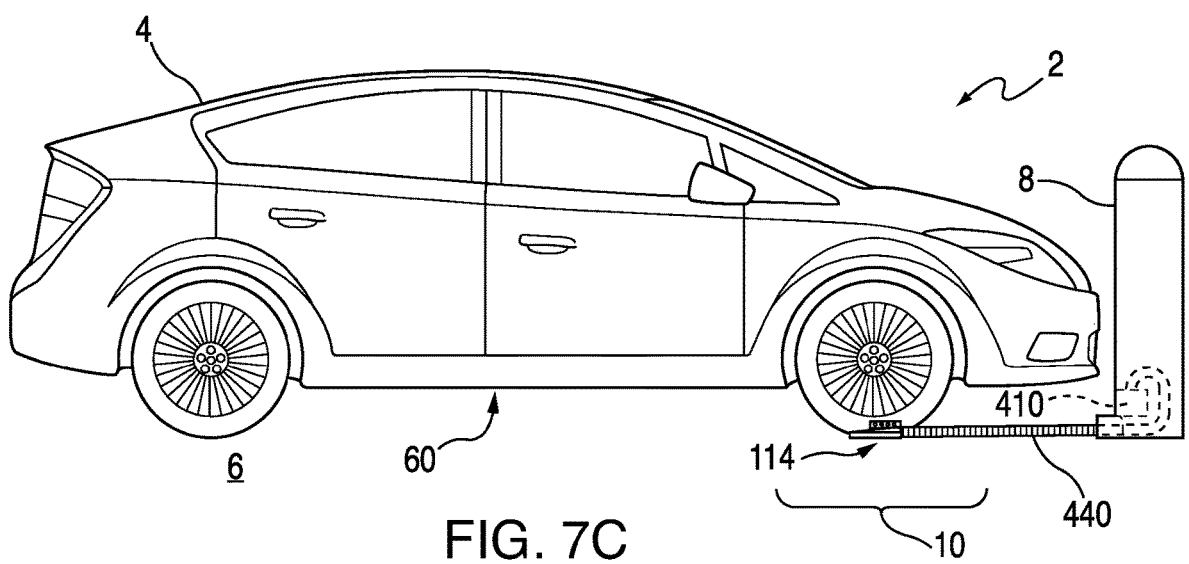

FIGS. 7A-7C are schematic diagrams illustrating aspects of the ACD of FIGS. 2A-2C and 3 according to embodiments of the disclosure. The ACD 8 housing 109 (e.g., post) defines an at least partially enclosed cavity 420. In the example, the housing 109 has an opening 430 permitting access to the charging environment 2 from the cavity 420. In this Example 3, charger link 51 is embodied in a cable chain 440. The charger link 51 in the form of cable chain 440 includes the lift mechanism 114 operably coupled the distal end 52, and the charger-side electrical connector 34 is operably coupled to the lift mechanism 114 (e.g., as shown and described above with reference to FIGS. 2A-2C). The proximal end 53 of the cable chain 440 charger link 51 is operably coupled to a drive mechanism 410 positioned inside of the cavity 420. Drive mechanism 410 includes actuators and/or motors (not shown) for moving the cable chain 440 from a retracted position (e.g., as shown in FIG. 7A) to an extended position (e.g., as shown in FIGS. 7B and 7C) through the opening 430. In the retracted position, the cable chain 440 charger link 51 is stowed in the cavity 420, as shown in FIG. 7A.

The cable chain 440 includes a plurality of links strung together so as to form a flexible assembly to ensheath one or more electrical cables or wires for carrying the current flow (12, 20) from the power source (e.g., grid) to the EV 4 power storage device 18 when such flow (12, 20) is selectively enabled 506 in method 500. The links of cable chain 440 are formed of a material that is sufficiently durable and heavy to cause them to rest on ground surface 6 during such times that cable chain 440 is being moved from the retracted position to the extended position (and likewise in the reverse movement sequence), while not being subject to excessive wear and tear on account of being moved by drive mechanism 410 in contact with ground surface 6. However, since none of the ACD 8 including cable chain 440 is within the boundaries of where the EV 4 parks in charging environment 2, the cable chain 440 or any of the charger link 51 and connector 34 embodiments of the disclosure, do not need to be drive-over tolerant.

In one embodiment, a length of cable chain 440 charger link 51 is sufficient to enable it to be moved using drive mechanism 410 from its retracted position as stowed in the housing 109 cavity 420 to the extended position with charger-side electrical connector 34 positioned in charging zone 10, as shown in FIGS. 7B and 7C. By way of example only, where the ACD 8 is installed at a distance of 2 meters from a center of the charging zone 10, a length of cable chain 440 is 2.2 meters. The additional length of 0.2 meters accounts for the length of cable chain 440 remaining in the cavity 420 even after it reaches the extended position (as shown in FIGS. 7B and 7C), along with a distance between the center of charging zone 10 and any of its corners.

In addition to cable(s) and/or wire(s) being ensheated by the links of cable chain 440, one end of an elongate flexible linkage (not shown) is coupled to at least a portion of the distal end 52. In an embodiment, the drive mechanism 410 is, or includes, a motorized pulley, and the elongate flexible linkage is embodied in a braided wire rope having one end coupled to the distal end 52, and the other end coupled to a pulley spool of drive mechanism 410. In the embodiment, operation of the pulley-type drive mechanism 410 in either rotary direction effects the respective movement of cable chain 440 either out of, or back into, the cavity 420 through the opening 430, as shown in FIGS. 7A-7C.

The actuators and/or motors of drive mechanism 410 and lift mechanism 114 are in communication with, and under the command of, controller 101 by way of wired or wireless signaling means. In this Example 3, for method 500, the controller 101 actuates 504 the charger-side electrical connector 34 from its initial position to the final position by actuating 504 it using the drive mechanism 410 and the lift mechanism 114. For instance, controller 101 causes the cable chain 440 charger link 51 to be moved through the opening 430 in response to determining 502 receipt of the EV-side electrical connector 38 to the charging zone 10 of EV 4 charging environment 2. Upon the lift mechanism 114 being positioned in the charging zone 10, controller 101 causes the actuator(s) of lift mechanism 114 to elevate the charger-side electrical connector 34 to facilitate achieving the final position in method 500.

In an embodiment, the cable chain 440 moves in a straight line out of, and back into, opening 430 under the action of drive mechanism 410. In the embodiment, the ACD 8 includes a rotary stage 450 and additional actuator(s) operably coupled to stage 450 and to controller 101. Under command of controller 101, the rotary stage 450 actuator(s) rotate the ACD 8 housing 109 about the perpendicular axis 64 either before, during, or after cable chain 440 (or any of the other charger link 51 embodiments described herein) is being actuated or otherwise moved away from, or back toward, the ACD 8 housing. With such rotation of housing 109, one ACD 8 unit may service more than one EV 4 charging zone 10. For instance, an ACD 8 according to Example 3 which rotates on rotary stage 450 can sequentially service four different EVs 4 when ACD 8 is positioned at or proximal a point proximal adjacent corners of four rectangular parking spaces in charging environment 2.

Example 4

Figure 8:
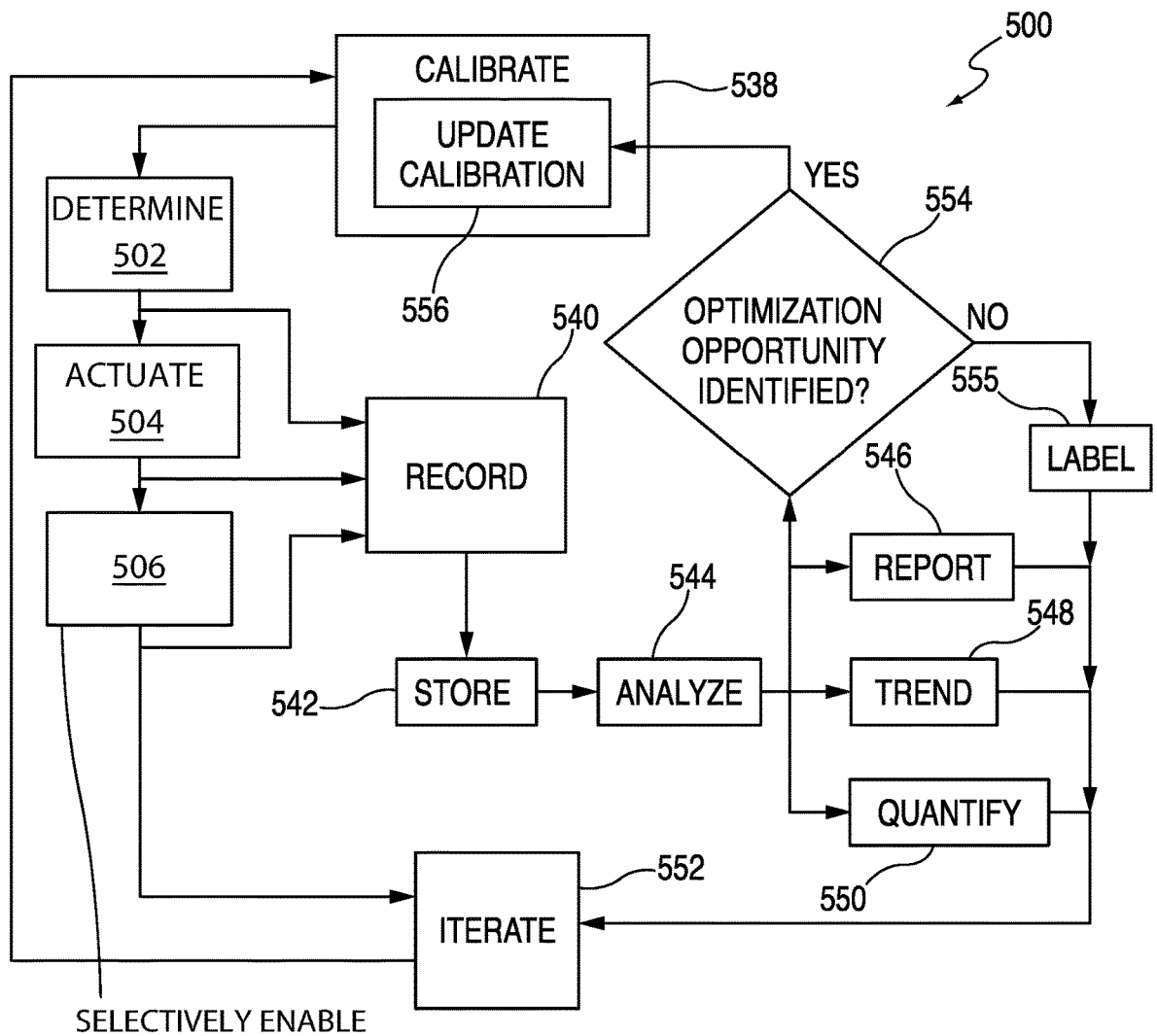
FIG. 8 is a flowchart of aspects of the method of FIG. 4 according to embodiments of the disclosure.

For each of the disclosed steps (e.g., determining 502, actuating 504, and others) of method 500, processor 68 of ACD 8 relies on various data transmitted or otherwise obtained from sensor(s) 103. FIG. 8 is a flowchart of aspects of the method of FIG. 4 according to embodiments of the disclosure. Referring to FIG. 8, for this Example 4, in method 500, processor 68 retrieves 538 calibration data from memory 102 for use in one or more of the determining 502, actuating 504, and other steps of method 500. For instance, at or near a time of installation of ACD 8 in charging environment 2, an initial set of calibration data is stored in memory 102 for use by processor 68 in method 500. In an example, actuator(s) (e.g., 121 and/or 123) include optical encoder(s) (not shown) operably coupled thereto so as to enable processor 68 to count rotations of, for example, an actuator motor shaft and thereby translate rotation of the shaft to linear and/or angular displacement of charger link 51. In the example, the calibration data includes a factor assigned and stored in memory 102 for each of the ACD 8 actuator(s) (121 and/or 123) that is used by processor 68 to translate an encoder count to linear and/or angular displacement of charger link 51, or parts thereof. In another example, calibration data includes settings for sensor(s) 103, for example, and without limitation, focus, color (e.g., RGB), F-stop, zoom, and filtering settings for a camera or other imaging sensor(s) 103. These calibration data are, under certain circumstances, specifically obtained for particular charging environments 2, EVs 4 and/or their respective vehicle units 16, and/or other physical characteristics related to the ACD 8, its particular components and configurations (e.g., as disclosed herein), and/or the facilities in which they are installed. In embodiments in which the retrieving 538 step of method 500 is performed, implemented, and/or facilitated, at least in part using software 106 or firmware, processor 68 executes program instructions stored as a calibration data retrieving module in the non-transitory computer-readable storage medium 104.

In Example 4, for method 500, processor 68 records 540 and stores 542 various data obtained from sensor(s) 103 and/or computed by processor 68 based on sensor 103 data. These operational data include data associated with performance of one or more of the determining 502 and actuating 504, and other steps in method 500. For instance, data obtained from sensor(s) 103 and/or computed by processor 68 for determining 516 the displacement(s) for use in the actuating 504 step of method 500 is recorded 540 and stored 542 in memory 102 (including, e.g., from the actuator 56 encoder(s)) along with any processor 68-computed results based on sensor 103 data (e.g., angles, distances, and determined 516 displacement value(s), and/or the amount of time it took to complete the actuating 504 step) necessary or otherwise useful for accomplishing the determining 502 and actuating 504 steps in method 500. Instead of, or in addition to, being stored in memory 102 of ACD 8, processor 68 may cause the recorded 540 data to be transmitted to memory resources at a location remote from ACD 8 (e.g., cloud storage). In embodiments in which the recording 540 and/or storing 542 step(s) of method 500 is/are performed, implemented, and/or facilitated, at least in part using software 106 or firmware, processor 68 executes program instructions stored as operational data recording and/or operational data storing module(s) in the non-transitory computer-readable storage medium 104.

By way of automated and/or manual procedures, either of which may be implemented and/or mediated by users, servicers, administrators, and/or software as a service (SaaS) providers of, or for the benefit of, ACD 8, processor 68 uses the recorded 540 and stored 542 data to various beneficial ends in method 500. For this purpose, in method 500, processor 68 analyzes 544 the recorded 540 and stored 542 data to determine and identify 554 whether or not an opportunity exists to optimize performance of one or more of the steps of method 500 as disclosed herein. In an embodiment, this determination and identification 554 step in method 500 makes uses of one or more metrics that are either formulated over time (e.g., using, at least in part, machine learning techniques), or are predetermined for the ACD 8 during design, manufacture, and/or installation. In any event, the metrics are stored in memory 102 for use by processor 68 in method 500. Such metrics may include, for example and without limitation, accuracy, precision, and speed, among other operational attributes that may be useful for evaluating ACD 8 performance in method 500. For instance, in a first operational sequence of performance of method 500, processor 68 determines 554, based on recorded 540 and stored 542 operational data for the first actuating 522 step, that the accuracy and precision with which the charger-side electrical connector 34 was actuated 504 to the final position inside of the charging zone 10 was within an optimal level of accuracy and precision, but that the speed at which the actuating 504 was performed could be improved by a factor of, for example, 1.15 (e.g., processor 68 implements a 15% increase in speed for the control scheme in at least a second method 500 operational sequence to facilitate meeting, or at least improving, the speed metric for the actuating 504 step). In an embodiment, processor 68 causes the results of computations performed during the analyzing 544 and/or the determining/identifying 554 steps to be stored in memory 102. In embodiments in which the analyzing 544 and/or determining/identifying 554 step(s) of method 500 is/are performed, implemented, and/or facilitated, at least in part using software 106 or firmware, processor 68 executes program instructions stored as operational data analysis and/or operational optimization module(s) in the non-transitory computer-readable storage medium 104.

In cases where processor 68 identifies 554 an opportunity to optimize one or more aspects of operation of ACD 8 in method 500, processor 68 updates 556 the calibration data for the calibrating step 538 according to the results of the analyzing 544 step, thereby updating 556 the calibration data for use in method 500, including for one or more of the determining 502, and actuating 506 steps. Otherwise, where processor 68 does not determine and identify 554 such an optimization opportunity in method 500, processor 68 causes the recorded 540 and stored 542 operational data for a respective operational sequence of method 500 to be labeled 555 in memory 102 as a successful (e.g., meeting or exceeding the performance metric(s)) method 500 operational sequence. An identifier of the ACD 8 (e.g., serial number), the EV 4 driver, and/or the EV 4 for which ACD 8 was used for the successful method 500 operational sequence may also be labeled 555 in memory 102 for the respective operational data set. Then, processor 68 iterates 552 through method 500 by, for example, waiting for another method 500 operational sequence including steps 502, 504 and 506 for charging an EV 4 using ACD 8. In embodiments in which the iterating 552 step of method 500 is performed, implemented, and/or facilitated, at least in part using software 106 or firmware, processor 68 executes program instructions stored as an iterating module in the non-transitory computer-readable storage medium 104.

In Example 4, for method 500, the operational data generated, or otherwise provided, through performance of the analyzing 544 step, and in some embodiments, the determining/identifying 554 step, are stored locally in ACD 8 memory 102 and/or using remote (e.g., cloud) memory storage resources, and such data may be retrieved periodically when, for instance, scheduled ACD 8 servicing is performed. These data are used by processor 68 and/or remote (e.g., cloud) computing resources for generating 546 ACD 8 operational reports, performing 548 trending of ACD 8 operation data, and quantifying 550 ACD 8 user and/or EV 4 driver behavior and/or habits (e.g., operational and/or behavioral operational data). For instance, users of ACD 8 may receive generated 546 reports providing indications of corrective actions or maintenance for ACD 8 and/or aspects of vehicle unit 16 in response to certain EVs 4 in their fleet (or their respective drivers) experiencing recurring operational issues. Identifying such issues using generated 546 reports may facilitate ACD 8 user and/or EV 4 training initiatives, as well as aid in keeping the one or more EVs 4 using ACD(s) 8 operational in an efficient and continuous manner. In embodiments in which the generating 546, performing 548 and/or quantifying 550 step(s) of method 500 is/are performed, implemented, and/or facilitated, at least in part using software 106 or firmware, processor 68 executes program instructions stored as reporting, trending, and/or quantifying module(s) in the non-transitory computer-readable storage medium 104.

Performing 548 trending of ACD 8 operational data can similarly aid in establishing maintenance and/or training regimes for ACD 8 users and/or EV 4 drivers. Since operational data recorded 540 and stored 542 in method 500 is made available for performing 548 trending, and since these data are analyzed 544, at least in part, with respect to metrics, specific ACD 8 components may be identified as requiring maintenance (e.g., cleaning a lens of a camera or other imaging sensor 103, or clearing an inlet of EV-side electrical connector 38) before problems occur that may cause ACD 8 to be inoperable or require removal for off-site servicing. Performing 548 trending for such purposes is especially advantageous to ACD 8 users when employed in conjunction with regularly scheduled ACD 8 and EV 4 preventative maintenance routines. Quantifying 550 ACD 8 user and/or EV 4 driver behavior and/or habits facilitates developing an understanding of operational aspects of the ACD 8 customer base, EV 4 fleets, and/or EV 4 drivers to inform further developments in the ACD 8, its operating software 106, and/or individual ACD 8 components and/or software 106 modules. As disclosed, for instance, in Example 4, the beneficial outcomes provided by the recording 540, storing 542, analyzing 544, determining/identifying 554, updating 556, generating 546, performing 548, quantifying 550 and iterating 552 steps of method 500 enable continuous improvement of ACD 8 control schemes to dynamically address environmental, behavioral, and operational concerns to provide optimized performance with respect to the ACD 8 metrics (e.g., connection accuracy and precision, timing, number of attempts, movement times, and the actual commands issued by, for example, processor 68.

In summary, in accordance with Example 4, method 500 includes recording 540, and storing 542 in memory (e.g., ACD 8 memory 102) operational data associated with performance of the disclosed method 500 steps, including one or more of the: determining 502, and actuating 504, steps of the method 500. The method 500 includes analyzing 544 the stored 542 operational data to determine/identify 554, based on the stored 542 operational data, whether or not an opportunity exists to optimize performance of the disclosed method 500 steps, including one or more of the: determining 502, and actuating 504, steps of the method 500. If, during the determining/identifying 554 step, such an optimization opportunity is determined/identified 554 to exist, then method 500 proceeds to update 556 calibration data for use in the disclosed method 500 steps, including one or more of the: determining 502, and actuating 504, steps of the method 500, according to a result of the analyzing 544 step. Otherwise, if, during the determining/identifying 554 step, no such optimization opportunity is determined/identified 554 to exist, then method 500 proceeds to label 555 the stored 542 operational data in memory (e.g., ACD 8 memory 102) as a successful operational sequence for the method 500. Result(s) of analyzing 544 the stored 542 operational data facilitates performance of at least one of the following steps in method 500: generating 546 an operational report according to the result(s) of the analyzing 544 step; performing 548 trending of the stored 542 operational data according to the result(s) of the analyzing 544 step; and quantifying 550 operational and/or behavioral operational data according to the result(s) of the analyzing 544 step.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

Embodiments of the present disclosure are described with reference to the flowcharts and/or block diagrams of the method, the device (system), and the computer program product according to the embodiments described herein. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus or module. The instruction apparatus or module implements a specific function in one or more processes in the flowcharts and/or in one or more blocks in the block diagrams.

These computer program instructions may be loaded onto a computer or another programmable data processing device, so that a series of operations and steps are performed on the computer or other programmable device, thereby generating computer-implemented processing. Therefore, the instructions executed on the computer or other programmable device provide steps for implementing a specific function in one or more processes in the flowcharts and/or in one or more blocks in the block diagrams.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:
1. An automatic charging device for an electric vehicle (EV), the device comprising:
  a charger link having distal and proximal ends;
  a charger-side electrical connector operably coupled to the charger link proximal the distal end thereof, the charger-side electrical connecter configured to mate with an EV-side electrical connector;
  an actuator operably coupled to the charger link proximal the proximal end thereof for moving the charger link distal end toward the EV-side electrical connector;
  at least one sensor for providing at least one signal representative of a position of the EV-side electrical connector in a charging environment;
  a controller in communication with the actuator and the at least one sensor, the controller configured to:

determine, based on the at least one signal, receipt of the EV-side electrical connector to a charging zone of the charging environment; and actuate, using the actuator, the charger-side electrical connector from an initial position outside of the charging zone to a final position inside of the charging zone, the final position corresponding to the charger-side electrical connector matingly engaged with the EV-side electrical connector; and a memory configured to store operational data associated with performance by the controller of the determining receipt of the EV-side electrical connector and the actuating the charger-side electrical connector, wherein the controller is further configured to analyze the operational data stored in the memory to determine, based on the stored operational data, whether or not an opportunity exists to optimize the performance by the controller of one or more of determining receipt of the EV-side electrical connector and actuating the charger-side electrical connector; and if the opportunity exists, then:
updating calibration data for use in the performance by the controller of one or more of determining receipt of the EV-side electrical connector and actuating the charger-side electrical connector, else:
labelling the stored operational data in the memory as a successful operational sequence.

2. The device of claim 1, wherein the controller is further configured to:
receive the at least one signal further representative of a position of the EV-side electrical connector outside of the charging zone; and
determine, based on the at least one signal, a position of the EV-side electrical connector relative to the initial position of the charger-side electrical connector.

3. The device of claim 2, further comprising a human machine interface (HMI) coupled in communication with the controller, wherein the controller is further configured to transmit, based on the determined position and using the HMI, guidance information to the charging environment to facilitate the receipt of the EV-side electrical connector to the charging zone.

4. The device of claim 2, wherein the EV is an autonomous, or semi-autonomous, EV, the autonomous or semi-autonomous EV including an autonomous vehicle driving control system, the device further comprising a transmitter coupled in communication with the controller, wherein the controller is further configured to transmit, based on the determined position and using the transceiver, guidance information to the autonomous vehicle driving control system to facilitate the receipt of the EV-side electrical connector to the charging zone.

5. The device of claim 2, wherein the controller is further configured to determine, based on the at least one signal further representative of a position of the EV-side electrical connector inside of the charging zone, a stationary position of the EV-side electrical connector in the charging zone, and wherein, to actuate the charger-side electrical connector, the controller is further configured to actuate the charger-side electrical connector according to the stationary position.

6. The device of claim 5, wherein the controller is further configured to determine, based on the stationary position, a displacement for actuating, using the actuator, the charger-side electrical connector.

7. The device of claim 6, wherein, to actuate the charger-side electrical connector, the controller is further configured to actuate the charger-side electrical connector according to the displacement.

8. The device of claim 6, wherein the charger link comprises an at least two-piece charger link, the at least a two-piece charger link including a first piece and at least a second piece operably coupled to the first piece, and wherein, to determine the displacement, the controller is further configured to:
determine a first displacement of the first piece; and
determine at least a second displacement of the at least a second piece.

9. The device of claim 8, wherein the actuator comprises:
a first actuator operably coupled to a first end of the first piece, and at least a second actuator operably coupled to a second end of the first piece and to a first end of the at least a second piece, the at least a second piece having a second end corresponding to the charger link proximal end, and wherein, to actuate the charger-side electrical connector, the controller is further configured to:
actuate, using the first actuator, the first piece according to the first displacement; and
actuate, using the at least a second actuator, the at least a second piece according to the at least a second displacement.

10. The device of claim 1, wherein, to actuate the charger-side electrical connector, the controller is further configured to actuate the charger-side electrical connector in response to determining receipt of the EV-side electrical connector to the charging zone.

11. The device of claim 10, wherein the controller is further configured to:
receive the at least one signal further representative of motion of the EV in the charging environment; and
determine, based on the at least one signal, that the EV is stationary.

12. The device of claim 11, wherein, to actuate the charger-side electrical connector, the controller is further configured to actuate the charger-side electrical connector in response to determining that the EV is stationary.

13. The device of claim 1 further comprising a housing defining an at least partially enclosed cavity and having an opening permitting access to the charging environment from the cavity, wherein the initial position corresponds to a stowed position of the charger side electrical connector at least partially inside the cavity, and wherein, to actuate the charger-side electrical connector, the controller is further configured to actuate the charger-side electrical connector from the initial to the final position through the opening.

14. A method for charging an electric vehicle (EV) with an automatic charging device (ACD), comprising:
determining, by a controller of the ACD, receipt of an EV-side electrical connector to a charging zone of an EV charging environment; and
actuating, by the controller using an actuator of the ACD, a charger-side electrical connector from an initial position outside of the charging zone to a final position inside of the charging zone, the charger-side electrical connector being configured to mate with the EV-side electrical connector, the final position corresponding to the charger-side electrical connector matingly engaged with the EV-side electrical connector, and wherein the charger-side electrical connector is electrically coupled to a power source positioned outside of the EV;

storing in memory operational data associated with performance of one or more of the determining and actuating steps of the method;

analyzing the stored operational data to determine, based on the stored operational data, whether or not an opportunity exists to optimize performance of one or more of the determining and actuating steps of the method; and if the opportunity exists, then:

updating calibration data for use in one or more of the determining and actuating steps of the method according to a result of the analyzing step, else:

labelling the stored operational data in memory as a successful operational sequence for the method.

15. The method of claim 14 further comprising:
receiving, by the controller, at least one signal from a sensor, the at least one signal representative of a position of the EV-side electrical connector outside of the charging zone; and determining, by the controller and based on the at least one signal, a position of the EV-side electrical connector relative to the initial position of the charger-side electrical connector.

16. The method of claim 15 further comprising transmitting, by the controller and based on the determined position, guidance information using a human machine interface of the ACD to the charging environment to facilitate the receipt of the EV-side electrical connector to the charging zone.

17. The method of claim 15, wherein the EV is an autonomous, or semi-autonomous, EV, the autonomous or semi-autonomous EV including an autonomous vehicle driving control system, the method further comprising transmitting, by the controller and based on the determined position, guidance information using a transmitter of the ACD to the autonomous vehicle driving control system to facilitate the receipt of the EV-side electrical connector to the charging zone.

18. The method of claim 15 further comprising determining, by the controller and based on the at least one signal further representative of a position of the EV-side electrical connector inside of the charging zone, a stationary position of the EV-side electrical connector in the charging zone.

19. The method of claim 18 wherein actuating the charger-side electrical connector comprises actuating the charger-side electrical connector according to the stationary position.

20. The method of claim 18, further comprising determining, by the controller and based on the stationary position, a displacement for actuating the charger-side electrical connector.

21. The method of claim 20, wherein actuating the charger-side electrical connector comprises actuating the charger-side electrical connector according to the displacement.

22. The method of claim 14 further comprising analyzing the stored operational data to facilitate at least one of:
generating an operational report according to a result of the analyzing step;
performing trending of the stored operational data according to the result of the analyzing step; and
quantifying operational and/or behavioral data according to a result of the analyzing step.

23. A non-transitory computer-readable storage medium having stored thereon program instructions which, when executed by one or more processors of an automatic charging device (ACD) for an electric vehicle (EV), cause the ACD to:
determine receipt of an EV-side electrical connector to a charging zone of an EV charging environment;
actuate a charger-side electrical connector of the ACD from an initial position outside of the charging zone to a final position inside of the charging zone, the charger-side electrical connector being configured to mate with the EV-side electrical connector, the final position corresponding to the charger-side electrical connector matingly engaged with the EV-side electrical connector, and wherein the charger-side electrical connector is electrically coupled to a power source positioned outside of the EV;
store in memory operational data associated with performance by the ACD of one or more of the determining receipt of the EV-side electrical connector and the actuating the charger-side electrical connector;
analyze the stored operational data to determine, based on the stored operational data, whether or not an opportunity exists to optimize performance by the ACD of one or more of the determining receipt of the EV-side electrical connector and the actuating the charger-side electrical connector; and
if the opportunity exists, then:
update calibration data for use in the performance by the ACD of one or more of the determining receipt of the EV-side electrical connector and the actuating the charger-side electrical connector according to a result of the analyzing step,
else:
label the stored operational data in memory as a successful operational sequence.

* * * * *